April 6, 1943.  H. S. JANDUS  2,315,962
BRAKE LEVER
Filed Feb. 20, 1941  3 Sheets-Sheet 3

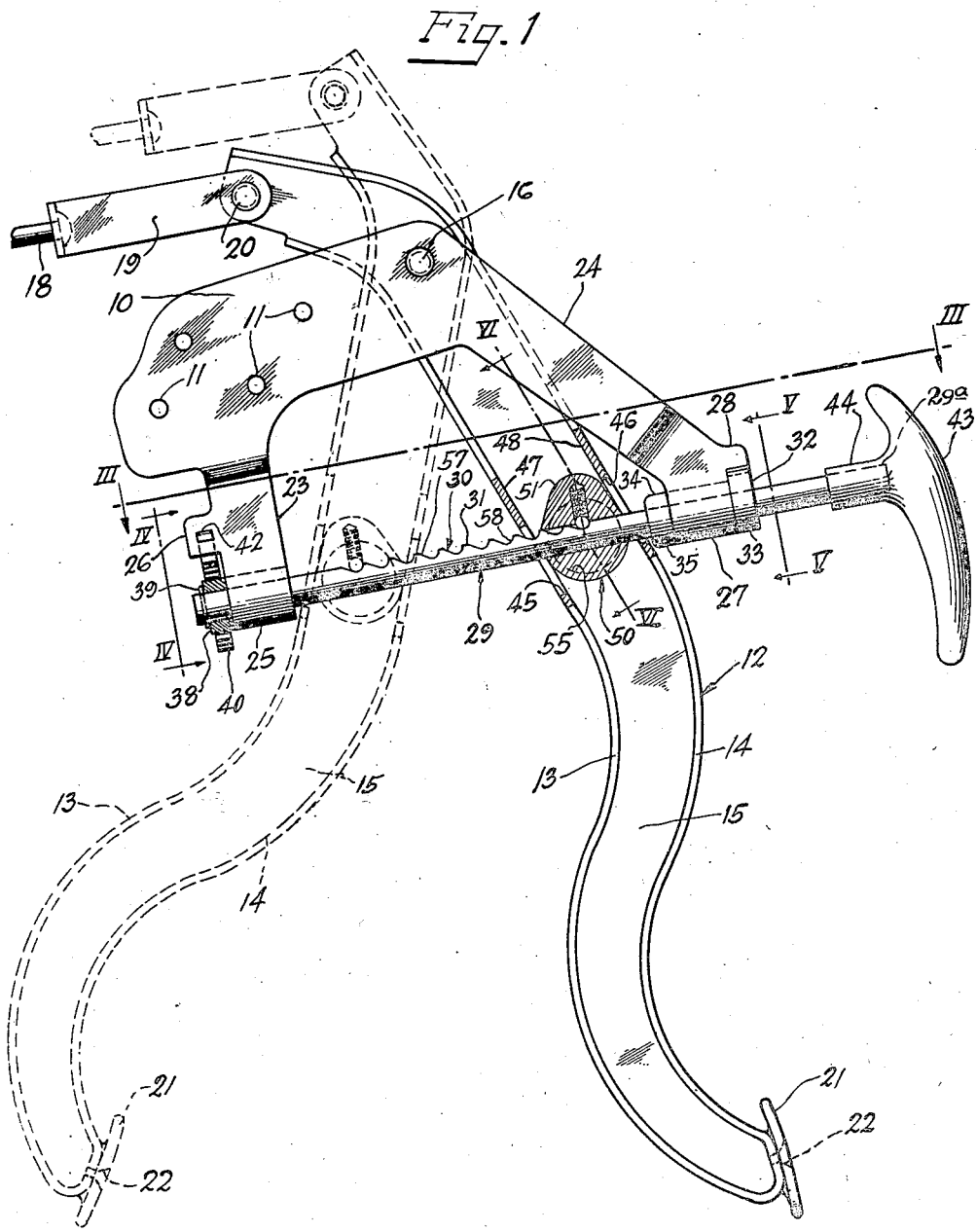

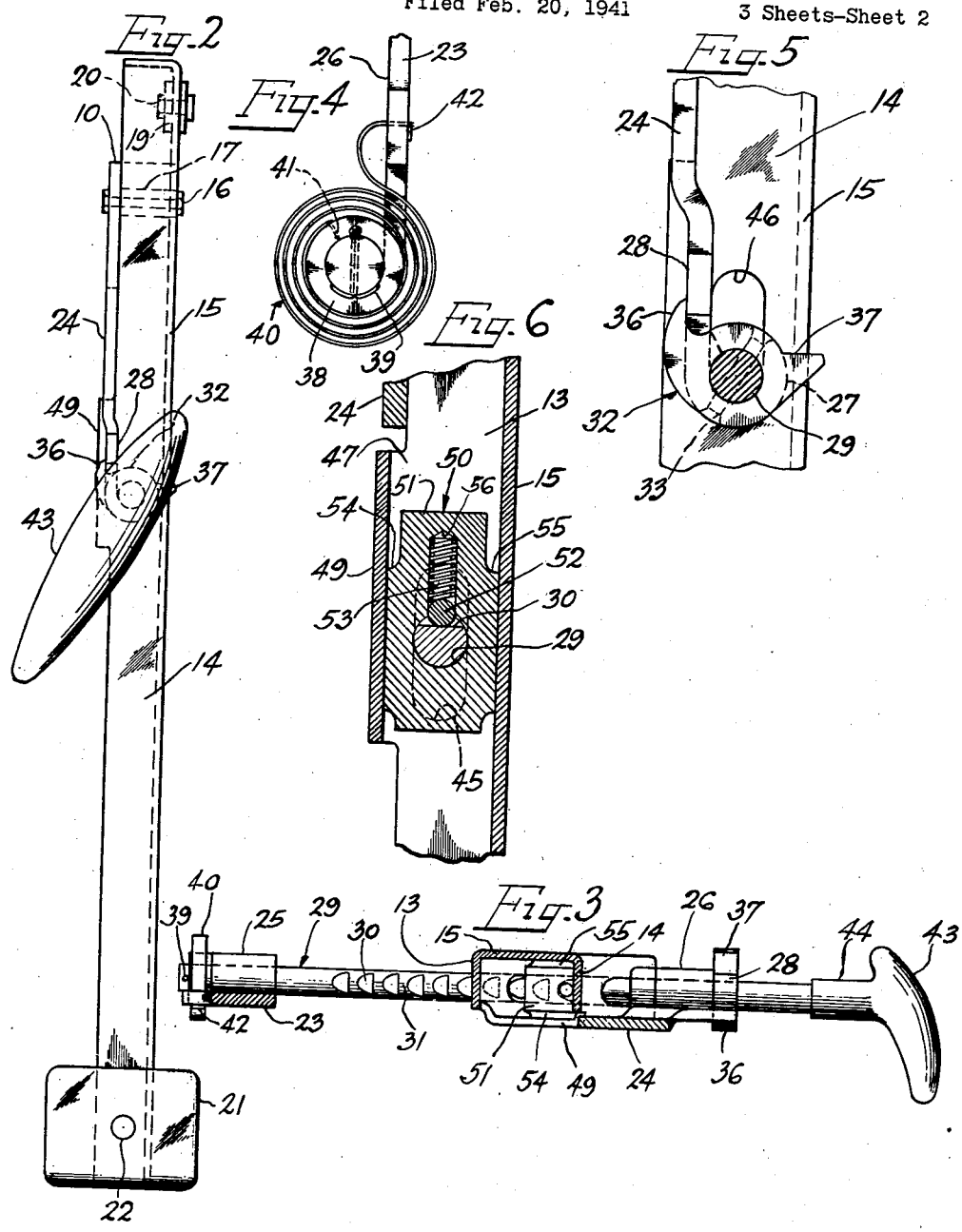

Inventor
Herbert S. Jandus
by Charles Stoll
Atty.

Patented Apr. 6, 1943

2,315,962

UNITED STATES PATENT OFFICE 2,315,962

BRAKE LEVER

Herbert S. Jandus, Detroit, Mich., assignor to Houdaille-Hershey Corporation, Detroit, Mich., a corporation of Michigan Application February 20, 1941, Serial No. 379,769

15 Claims. (Cl. 74—535)

This invention relates to a novel brake lever construction, and more particularly to an improved brake-operating device whereby the brakes of an automotive vehicle are set and released by the movement of a swinging member, the latter being held in and released from adjusted positions by coaction with a rotatable member.

Generally, the present invention provides a supporting member having spaced legs which support, for rotation only, a ratchet rod device. A swinging lever is pivotally hung from the support and is provided with a clutching member arranged for movement longitudinally of the lever. The clutching member slidingly embraces the ratchet rod and normally cooperates with the teeth thereon for holding the swinging lever in an adjusted position to which it is moved. Rotation of the ratchet rod moves the teeth thereof out of alignment with the engaging portion on the clutching member to permit free swinging movement of the pivoted lever in either direction.

An important object of the present invention is to provide novel clutch control means for the emergency brake of an automotive vehicle for holding the same in adjusted positions.

Another object of the present invention is to provide clutch control means for and supported independently of a swinging brake lever.

A further object of this invention is the provision of a rotatable ratchet member in combination with a swinging type of lever.

A still further object of this invention is the provision of cooperating clutching members movable relative to a swinging lever and cooperating to hold said swinging lever in and to release it from adjusted positions to which it is moved.

Still another object of the present invention is the provision of the combination of a swinging brake lever and a rotatable ratchet member being supported by a common support.

A further object of the present invention is the provision of a swinging brake lever having a clutch member carried thereby for limited relative movement in an axial direction of said lever.

Another and still further object of this invention is the provision of a swinging brake lever, having a clutch member carried thereby and arranged for axial movement relative thereto, in combination with a rotatable ratchet member normally cooperating with said clutch member to hold said lever in adjusted swung positions and rotatable for releasing said lever from said positions.

A still further object of the present invention is to provide a brake operating means which is simple in construction, durable and efficient in use, and which may be readily applied in place.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a side elevational view, with parts shown in vertical cross section, of a brake lever mechanism constructed in accordance with the principles of the present invention, illustrating, in full lines, the relative position of parts when the mechanism is in released position and, in dotted lines, the position of the brake lever when in fully actuated position;

Figure 2 is an end view in elevation, as seen from the right, of the brake lever mechanism illustrated in Figure 1;

Figure 3 is a transverse cross-sectional view, with parts in elevation, as seen when looking down in the direction of the arrows and taken substantially in the plane indicated by the line III—III of Figure 1;

Figure 4 is an enlarged fragmentary end view, as seen from the left, of the portion of the brake lever mechanism embraced by the line indicated at IV—IV of Figure 1;

Figure 5 is an enlarged fragmentary end view as seen in the plane indicated by the line V—V of Figure 1;

Figure 6 is an enlarged fragmentary cross-sectional view, as seen from the right looking in the direction of the arrows, taken substantially in the plane indicated by the line VI—VI of Figure 1; and, Figure 7 is a view similar to Figure 1 illustrating a modified form of brake lever mechanism constructed in accordance with the principles of the present invention.

Figure 7:
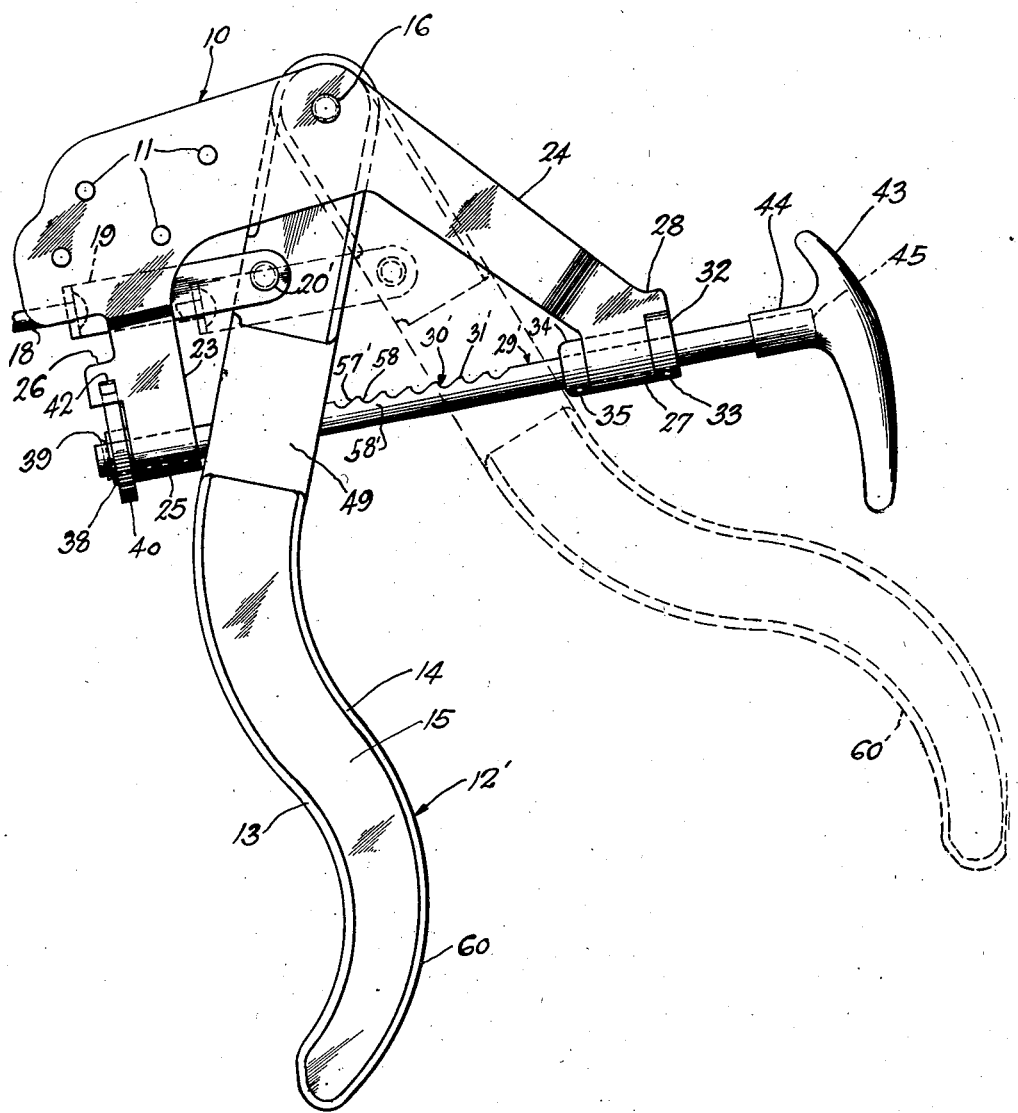

The brake lever construction illustrated herein provides for the novel combination of a so-called dash type of lever and a clutching device, one clutch member of which is carried by the lever for movement relative thereto and the other clutch member being arranged for rotation for actuating the clutching device into and out of holding cooperation.

As particularly shown in the embodiment of Figure 1, the brake lever construction of this invention provides a mounting plate or support bracket 10 of flat metal stamped and shaped to proper size and form for connection to a vehicle (not shown) by means of bolts, rivets or the like passing through suitable apertures 11. With the supporting bracket 10 attached to the dash or body portion of the vehicle, the brake lever 12 is suitably supported therefrom to extend to a position for convenient operation by the vehicle operator.

As best shown in Figures 2 and 3, the lever 12 is formed U-shape in cross section with side walls 13 and 14 and a connecting web 15. A suitable pivot 16, such as a bolt or rivet, connects the lever 12 to the support 10 with the forward edges of the side walls 13 and 14 being slidably seated on the support. A spacer 17, embracing the pivot 16, serves to maintain the web 15 spaced sufficiently from the support 10 to permit the lever to swing thereon.

A rod 18, for actuating and releasing the vehicle brakes, is pivotally connected to the upper end of the lever web 15 by means of a clevis 19 and a pivot pin 20. A foot pedal pad 21, by means of which the lever is manually actuated, is connected to the lower end of the lever 12 by a flat head rivet 22.

The supporting bracket 10 is provided with depending legs 23 and 24 at the ends thereof. The leg 23 terminates in a tubular portion 25 and is provided with an outwardly extending lug 26 for a purpose to be more fully described hereinafter. Likewise, the leg 24 terminates in a tubular portion 27 and is also provided with a lug 28 which extends outwardly in a direction opposing the lug 26.

The tubular portions 25 and 27 are in axial alignment to receive therethrough and rotatably support an elongated ratchet rod 29. A row of socket slots 30, defining ratchet teeth 31 therebetween, are provided in a straight line path along an edge of the ratchet rod intermediate its ends and lying between the support legs 23 and 24.

A thrust collar 32 (Figures 1 and 5) embraces the ratchet rod 29 and is connected thereto by means of a rivet 33 or the like. The collar restricts the ratchet rod against endwise movement in one direction by engaging against the forward face of the tubular support 27. Another collar 34 embraces and is connected to the ratchet rod by means of a rivet 35 in spaced relation from the thrust collar 32 for receiving therebetween the tubular support 27. The collars maintain the ratchet rod against endwise movement in either direction but permit rotation.

It is to be noted (Figure 5) that the thrust collar 32 has two radially extending ears 36 and 37 which engage the side surfaces of the lug 28 to define the limits of rotation of the ratchet rod 29.

A collar 38 is pressed on or otherwise suitably secured to the end of the ratchet rod 29 adjacent the tubular support 25. If desired, a cotter pin 39 may be inserted through an aperture in the ratchet rod adjacent the collar 38 to eliminate the possibility of the collar working off the end of the rod.

A coil spring 40 of flat metal has its inner coil seated around the periphery of the collar 38 with its inner end 41 embedded within a suitable radially extending recess. The opposite end 42 of the spring 40 is inserted through an aperture in the support lug 26 and bent downwardly against a face thereof. When so positioned, the coil spring serves to normally resist rotation of and to maintain the ratchet rod in a position in which the row of ratchet teeth 31 face upwardly.

A T-shaped handle 43 is provided with a socket portion 44 for receiving the end 29a of the ratchet rod. Connection therebetween (not shown) is by any suitable means such as a rivet, welding or the like.

As best shown in Figures 1, 5 and 6, suitable elongated apertures 45 and 46 are provided in the side walls 13 and 14 of the lever to receive therethrough the ratchet rod 29. These slots are of a length sufficient to permit the lever 12 to swing between the legs 23 and 24 from the position illustrated in full lines to the position illustrated in dotted lines of Figure 1. The lever side walls project outwardly at the intermediate portions 47 and 48 and a plate 49 extends thereacross. While the plate 49 is illustrated as being an integral portion of the brake lever 12, it is to be understood that it may, if desired, be a separate plate welded or otherwise suitably connected to the intermediate projecting portions thereof. The plate 49, together with the adjacent side wall and web portions of the lever form a box-like portion for a purpose to be now explained.

A pawl mechanism 50 is inserted within said box-like portion of the lever 12 and comprises a block member 51, and a plunger mechanism consisting of a ball 52 and a coil spring 53. The block member 51 is apertured to slidingly receive the ratchet rod 29 therethrough. As shown in Figure 1, the block member 51 is ovate in side configuration with round bosses 54 and 55 extending outwardly in an axial direction (Figure 6). These bosses seat against the plate 49 and the web 15 while the broad base portion seats against the side walls 13 and 14. The narrow apex portion is rockable from side wall to side wall in a manner as shown in Figure 1 as the brake lever is swung between maximum limits.

A recess 56 extends radially from the aperture in the block member, through which the ratchet rod slides, to receive the coil spring 53 therein. The ball 52 is urged by the spring 53 into seating engagement with a socket recess 30 to maintain the brake lever 12 in an adjusted position to which it is moved. This engagement between the ball and an adjacent socket slot allows for swinging movement of the brake lever 12 in a direction to the left in which the ball cams along the sloping surfaces 57 of the teeth 31. The engagement of the ball and a semi-circular surface 58, however, prevents swinging movement of the brake lever 12 in a direction to the right.

With the brake lever assembly in the fully brake-released position as shown in full lines of Figure 1, the operator merely presses against the foot pedal 21 to push the lever toward the left to the fully brake-actuated position shown in dotted lines. This movement pulls the brake rod 18 toward the right for actuating the brakes. As the lever 12 moves from one swinging limit to the other, the block member 51 is moved therewith along the ratchet rod but is constantly maintained in a position in which the recess 56 is normal with respect to the longitudinal axis of the ratchet rod. The side wall 14 of the lever engages one edge of the block member 51 when in full brake-released position while the opposite edge engages the side wall 13 when the lever has been moved to a full brake-actuated position.

The block member 51 is free for movement longitudinally along the box-like portion of the lever in order to permit the lever to swing in straddling relation with respect to the ratchet rod. The necessity of this provision is illustrated in Figure 1 by movement of the slotted portions of the side walls of the lever radially with respect to the ratchet rod.

Tension of the brake mechanism as exerted through the brake rod 18 tends to pull the lever 12 in a reverse direction or to a position in which the foot pedal 21 is moved to the right. This tendency is overcome by engagement of the ball 52 against the rounded surface 58 of one of the slots 30 thereby holding the lever in adjusted position.

Release of the lever 12 is effected by rotating the handle 43 in a counterclockwise direction whereby the ear 36 is rocked out of engagement with the lug 28 and the ear 37 is rocked into engagement with the opposite side surface of the lug (Figure 5). This rotation of the ratchet rod moves the row of teeth 30 out of alignment with the ball 52 and the ball then engages a smooth surface on the rod adjacent the teeth. The parts in this position allow the lever 12 to freely swing in a releasing direction under the influence of the tension of the brake rod 18.

After the lever has returned to its fully released position, the operator releases his grip on the handle 43 and the coil spring 40 then rotates the ratchet rod to its normal position in which the ear 36 engages the lug 28 and the ratchet teeth are in alignment with the spring-pressed ball 52.

Figure 7 illustrates a slightly modified form of brake lever construction in which the lever is arranged for hand actuation. In this construction, all parts similar to those of Figures 1 to 6 are identified by like reference numerals.

Brake lever 12' is pivotally connected at its upper end to the support bracket 10 by means of the pivot 16. The lower end of the lever is shaped as a hand grip or handle 60 whereby the lever is actuated to the swinging positions illustrated in full and dotted lines. A portion of the side wall 13 is cut away between the pivot 16 and the plate 49 to provide for the connection of the brake rod 18 and the clevis 19 to the web 15 by means of the pivot pin 20'.

In this modified form of construction, the lever and ratchet rod 29' coact in a manner similar to the preferred form of construction described previously herein. However, the slots 30' are in the reverse position from that shown and described with the ratchet rod 29. This is for the purpose of effecting holding engagement between the ball of the pawl mechanism (not shown) and the ratchet teeth 31' as the brakes are actuated by movement of the lever to the right due to the clevis being connected to the lever below instead of above the pivot pin 16. The ball ratchets over the sloping surfaces 57' and engages the semicircular surfaces 58' for holding the lever 12' in adjusted swung positions.

To actuate the brakes, the lever 12' is pulled to the right. Release is effected by turning the handle 43 in a counterclockwise direction. The row of ratchet teeth 31' is then moved out of alignment with the ball of the pawl mechanism and tension of the brake rod 18 moves the lever to the left. When the handle 43 is released the coil spring 40 rotates the ratchet rod 29' to its normal position in which the ratchet teeth are again in alignment with the pawl mechanism.

While the brake lever constructions illustrated and described herein provide for a spring-pressed ball engaging a socket slot in the ratchet rod, it is to be understood that any suitable plunger arrangement may be substituted therefor.

The brake lever constructions described herein provide a novel combination of a swinging lever and relatively movable cooperating clutch members. One of the clutching members is rotatably operable remote from the brake lever for releasing the cooperation of the clutching members and the brake lever from its adjusted held position.

While particular embodiments only of this invention have been illustrated, it will, of course, be understood that the invention should not be limited thereto, since many modifications may be made, and it is therefore contemplated by the appended claims to cover all such modifications as fall within the true spirit and scope of the present invention.

I claim as my invention:

1. A lever construction comprising a swinging member, clutching members normally cooperating for holding said swinging member in an adjusted position, means on said swinging member slidably and rotatably carrying one of said clutching members, and means on the other of said clutching members for actuating said clutching members into and out of said cooperation.

2. A lever construction comprising a swinging member, a first clutching member, a support mounting said swinging and first clutching members for movements relative to each other and to the support, a second clutching member carried by said first clutching member and slidingly embraced by said swinging member and normally cooperating with said first clutching member for holding said swinging member in an adjusted position, and means on one of said clutching members and remote from said swinging member for actuating said one clutching member into and out of holding cooperation with the other of said clutching members.

3. A lever construction comprising a support, a lever member pivotally connected to said support, a first clutching member connected to said support for rotation about its longitudinal axis, a second clutching member slidably mounted on said first clutching member and said lever member, said clutching members normally cooperating for holding said lever member in adjusted positions to which it is moved, and means for actuating one of said clutching members into and out of said holding cooperation.

4. A lever construction comprising a support, a lever member pivotally connected to said support to swing, a ratchet member rotatably mounted on said support and intersecting said lever, a pawl mechanism slidably carried by said lever member and said ratchet member and intersected by said ratchet member, said pawl mechanism normally engaging a portion of said ratchet member for maintaining said lever member in an adjusted position to which it is swung, and means for rotating said ratchet member to a position in which said pawl mechanism engages another portion of said ratchet member for releasing said lever member for free swinging movements.

5. A lever construction comprising a support member having spaced legs, a ratchet member rotatably supported by said legs, a lever member pivotally connected to said support member, a pawl mechanism carried by said lever member and said ratchet member for movement along their longitudinal axes, said pawl mechanism normally engaging said ratchet member for holding said lever member in an adjusted position to which it is moved, and means for rotating said ratchet member for releasing said lever member from said adjusted position.

6. A lever construction comprising a support member having spaced legs depending therefrom, a ratchet rod rotatably supported by said legs and having teeth along a portion thereof, a lever member pivotally connected to said support member to swing and having a box-like intermediate portion, a block member slidably embracing said ratchet rod and being carried in said box-like portion of the lever member for relative rotative and longitudinal movements, a plunger mechanism in said block member normally seated in a tooth of said ratchet rod, and means for rotating said ratchet rod to a position in which said plunger mechanism seats on a smooth surface on said ratchet rod adjacent said teeth.

7. A lever construction comprising a support member having spaced legs terminating in aligned tubular portions, a ratchet rod rotatably supported by said tubular portions and having teeth along a portion thereof between said support legs, means holding said ratchet rod against endwise movement, resilient means resisting rotation of said ratchet rod, a lever member pivotably connected adjacent one end to said support member and having its other end formed for manual actuation, a box-like portion on said lever member intermediate its ends and being arranged to slidingly receive said ratchet rod therethrough, an apertured block member seated in said box-like portion and slidingly receiving said ratchet rod therethrough, said block member being shaped for limited rotation within and for longitudinal sliding movement along said box-like portion, a spring pressed ball within said block member normally seated in a tooth on said ratchet rod, and a handle on said ratchet rod for rotating the teeth thereon out of alignment with said spring-pressed ball.

8. A lever construction comprising a support member having spaced legs terminating in aligned tubular portions, a ratchet rod rotatably supported by said tubular portions and having teeth along a portion thereof between said support legs, a collar connected to and for holding said ratchet rod against endwise movement and having ear portions for engaging said support member for limiting the rotation of said ratchet rod, a spring member connecting said ratchet rod and said support member for normally holding said ratchet rod in one position and for resisting rotation thereof, a lever member pivotally connected adjacent one end to said support member and having its other end formed for manual actuation, a box-like portion on said lever member intermediate its ends and being arranged to slidingly receive said ratchet rod therethrough, an apertured block member seated in said box-like portion and slidingly receiving said ratchet rod therethrough, said block member being shaped for limited rotation within and for longitudinal sliding movement along said box-like portion, a spring-pressed ball within said block member normally seated in a tooth on said ratchet rod, and a handle on said ratchet rod for rotating the teeth thereon out of alignment with said spring-pressed ball.

9. A lever construction comprising a support member having spaced legs terminating in aligned tubular portions, a ratchet rod rotatably supported by said tubular portions and having teeth along a portion thereof between said support legs, a collar connected to and for holding said ratchet rod against endwise movement and having ear portions for engaging said support member for limiting the rotation of said ratchet rod, a spring member connecting said ratchet rod and said support member for normally holding said ratchet rod in one position and for resisting rotation thereof, a U-shaped lever member pivotally connected adjacent one end to said support member and having its other end formed for manual actuation, a plate member bridging the side walls of said U-shaped lever member at an intermediate portion thereof, a block member seated in said intermediate portion of the lever member for limited rotation thereon and for sliding longitudinally therealong, registered apertures through the intermediate portion of said lever member and said block member for slidingly receiving said ratchet rod therethrough, a spring-pressed ball within said block member normally seated in a tooth on said ratchet rod, and a handle on said ratchet rod for rotating the teeth thereon to a position out of alignment with said spring pressed ball.

10. A brake lever construction comprising a lever member pivotally connected at one end to a support to swing and having a grip portion at its other end, a clutching member mounted for rotation about its longitudinal axis and being straddled by said lever member, a brake actuating member pivotally connected to said lever member between said clutching member and the pivoted support connection, and an additional clutching member carried by said lever member for movement longitudinally therealong and normally engaging said rotatable clutching member for holding said lever member in an adjusted position to which it is swung.

11. A brake lever construction comprising a lever member pivotally connected adjacent one end to a support to swing, a pedal for foot actuation at the other end of said lever member, a clutching member straddled by said lever member, means mounting said clutching member for rotation about its longitudinal axis, a brake actuating member pivotally connected to said lever member at its end adjacent the pivotal support connection, and an additional clutching member slidably carried by said lever member and normally engaging said rotatable clutching member for holding said lever member in an adjusted position to which it is swung.

12. A clutching construction comprising a ratchet rod supported at spaced points for rotation only and having a row of teeth thereon between said supporting points, a coil spring connected to said ratchet rod for resisting rotation thereof and for normally maintaining the teeth in one position, a pawl mechanism having an apertured block member slidably receiving the toothed portion of said ratchet rod therethrough, a spring-pressed ball within said block member and normally seated in one of said teeth, said block member being supported for movement along said ratchet rod, and a handle on said ratchet rod for rotating the latter, said pawl mechanism engaging a tooth of said ratchet rod when held in said one position.

13. A lever construction comprising a member having a pivotal mounting at one end and a manual actuating portion at its other end, a clutching member carried by said first member for relative rotative and longitudinal sliding movements, and a second clutching member mounted for rotation about its longitudinal axis and normally cooperating with said first clutching member, before rotation, for holding said first member in an adjusted position to which it is swung on its pivotal mounting and cooperating with said first clutching member, after rotation, for relative movement therebetween for releasing said first member from said adjusted position.

14. A lever construction comprising a support member, a ratchet member rotatably carried by said support member, means between said ratchet member and said support member for resisting movement of the ratchet member along its longitudinal axis but permitting rotation thereof around its longitudinal axis, a lever member pivotally connected to said support member, a pawl mechanism carried by said lever member and said ratchet member for movement along their longitudinal axes, said pawl mechanism normally engaging said ratchet member for holding said lever member in an adjusted position to which it is swung, and means for rotating said ratchet member for releasing said lever member from said adjusted position.

15. A lever construction comprising a support member, a toothed ratchet rod supported by said support member for rotation only, spring means between said ratchet rod and said support member resisting rotation of said ratchet rod, a lever member pivotally connected to said support member to swing, an apertured member carried by said lever member and slidably mounted on said ratchet rod, a resiliently urged plunger mechanism in said apertured member normally engaging the teeth on said ratchet rod for holding said lever in an adjusted swung position, and means for rotating said ratchet rod to a position in which said plunger mechanism seats on a smooth portion of the ratchet rod adjacent the teeth thereon for releasing said lever member from said adjusted position.

HERBERT S. JANDUS.